(12) United States Patent
Abe

(10) Patent No.: US 10,710,881 B2
(45) Date of Patent: Jul. 14, 2020

(54) FIBROUS CARBON NANOSTRUCTURE DISPERSION LIQUID

(71) Applicant: ZEON CORPORATION, Chiyoda-ku, Tokyo (JP)

(72) Inventor: Satoshi Abe, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/781,534

(22) PCT Filed: Dec. 15, 2016

(86) PCT No.: PCT/JP2016/087450
§ 371 (c)(1),
(2) Date: Jun. 5, 2018

(87) PCT Pub. No.: WO2017/104772
PCT Pub. Date: Jun. 22, 2017

(65) Prior Publication Data
US 2019/0002288 A1    Jan. 3, 2019

(30) Foreign Application Priority Data
Dec. 17, 2015    (JP) ................ 2015-246246

(51) Int. Cl.
*C01B 32/174*    (2017.01)
*B82Y 30/00*    (2011.01)
*B82Y 40/00*    (2011.01)

(52) U.S. Cl.
CPC ............ *C01B 32/174* (2017.08); *B82Y 30/00* (2013.01); *B82Y 40/00* (2013.01); *C01B 2202/30* (2013.01); *C01B 2202/32* (2013.01); *C01B 2202/36* (2013.01); *C01P 2002/88* (2013.01)

(58) Field of Classification Search
CPC ....... H01B 1/24; B82Y 30/00; C01B 31/0286; C08B 1/003
USPC ...................................................... 252/511
See application file for complete search history.

(56) References Cited

U.S. PATENT DOCUMENTS

| 7,556,746 | B2 | 7/2009 | Sen et al. |
| 7,854,991 | B2 | 12/2010 | Hata et al. |
| 2005/0058797 | A1 | 3/2005 | Sen et al. |
| 2008/0318049 | A1 | 12/2008 | Hata et al. |

(Continued)

FOREIGN PATENT DOCUMENTS

| JP | 4621896 B2 | 1/2011 |
| WO | 2004013043 A1 | 2/2004 |

(Continued)

OTHER PUBLICATIONS

Jan. 24, 2017, International Search Report issued in the International Patent Application No. PCT/JP2016/087450.

(Continued)

*Primary Examiner* — Khanh T Nguyen
(74) *Attorney, Agent, or Firm* — Kenja IP Law PC

(57) ABSTRACT

Provided is a fibrous carbon nanostructure dispersion liquid having excellent fibrous carbon nanostructure dispersibility. The fibrous carbon nanostructure dispersion liquid contains a solvent and one or more fibrous carbon nanostructures that exhibit a convex upward shape in a t-plot obtained from an adsorption isotherm.

9 Claims, 1 Drawing Sheet

(56) References Cited

U.S. PATENT DOCUMENTS

| | | | | |
|---|---|---|---|---|
| 2010/0224836 A1* | 9/2010 | Kitamura | ............... | C08B 1/003 252/511 |
| 2014/0353556 A1* | 12/2014 | Shigeta | ................ | B82Y 30/00 252/511 |
| 2016/0229695 A1 | 8/2016 | Yoshiwara | | |
| 2016/0251225 A1 | 9/2016 | Takai et al. | | |

FOREIGN PATENT DOCUMENTS

| | | |
|---|---|---|
| WO | 2004097853 A1 | 11/2004 |
| WO | 2006011655 A1 | 2/2006 |
| WO | 2006065937 A2 | 6/2006 |
| WO | 2015045418 A1 | 4/2015 |
| WO | 2015064772 A1 | 5/2015 |

OTHER PUBLICATIONS

Jun. 19, 2018, International Preliminary Report on Patentability issued in the International Patent Application No. PCT/JP2016/087450.

Jul. 26, 2019, the Extended European Search Report issued by the European Patent Office in the corresponding European Patent Application No. 16875749.0.

* cited by examiner

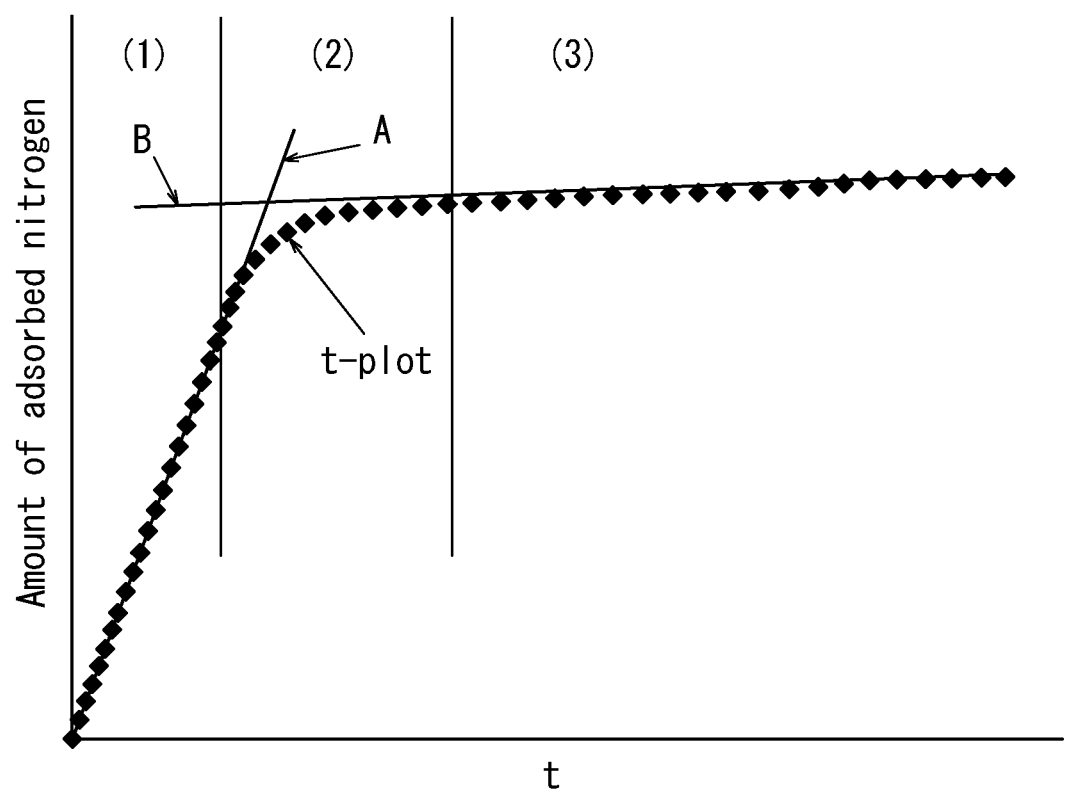

FIBROUS CARBON NANOSTRUCTURE DISPERSION LIQUID

TECHNICAL FIELD

This disclosure relates to a fibrous carbon nanostructure dispersion liquid.

BACKGROUND

Fibrous carbon materials, and in particular fibrous carbon nanostructures such as carbon nanotubes (hereinafter, also referred to as "CNTs"), have been attracting interest in recent years as materials having excellent electrical conductivity, thermal conductivity, and mechanical properties.

However, fibrous carbon nanostructures such as CNTs are fine structures having nanometer-size diameters, which makes handling and processing of individual nanostructures difficult. Therefore, it has been proposed that, for example, a solution containing dispersed CNTs may be prepared and applied onto a substrate or the like in order to cause a plurality of CNTs to assemble into the form of a film to form a carbon nanotube film (hereinafter, also referred to as a "CNT film") that can then be used as a conductive film or the like. A CNT film such as described may also be referred to as "buckypaper". In one known example of an application liquid in which CNTs are dispersed, the application liquid contains high-purity CNTs that are dispersed in a solvent (refer to PTL 1).

CITATION LIST

Patent Literature

PTL 1: U.S. Pat. No. 7,556,746 B2

SUMMARY

Technical Problem

However, CNT aggregation has a higher tendency to occur in the case of the application liquid described in PTL 1 as a consequence of pretreatment being performed to increase CNT purity. This reduces light absorbance of the application liquid and results in inadequate CNT dispersibility in the obtained application liquid. Since a CNT film formed using an application liquid with inadequate dispersibility has poor electrical conductivity and strength, there is currently demand for fibrous carbon nanostructure-containing dispersion liquids having excellent dispersibility.

Accordingly, an objective of this disclosure is to provide a fibrous carbon nanostructure dispersion liquid having excellent fibrous carbon nanostructure dispersibility.

Solution to Problem

The inventor conducted diligent studies with the aim of solving the problems set forth above. Through these studies, the inventor discovered that a dispersion liquid having excellent fibrous carbon nanostructure dispersibility can be obtained by using specific fibrous carbon nanostructures, and thereby completed this disclosure.

Specifically, this disclosure aims to advantageously solve the problems set forth above by disclosing a fibrous carbon nanostructure dispersion liquid comprising: one or more fibrous carbon nanostructures that exhibit a convex upward shape in a t-plot obtained from an adsorption isotherm; and a solvent. A dispersion liquid such as set forth above has excellent fibrous carbon nanostructure dispersibility.

In the presently disclosed fibrous carbon nanostructure dispersion liquid, the t-plot preferably has a bending point within a range of $0.2 \leq t \text{ (nm)} \leq 1.5$. A dispersion liquid such as set forth above has even better fibrous carbon nanostructure dispersibility.

In the presently disclosed fibrous carbon nanostructure dispersion liquid, total specific surface area S1 and internal specific surface area S2 obtained from the t-plot preferably satisfy $0.05 \leq S2/S1 \leq 0.30$. A dispersion liquid such as set forth above has even better fibrous carbon nanostructure dispersibility.

The presently disclosed fibrous carbon nanostructure dispersion liquid preferably does not substantially contain a dispersant. A dispersion liquid such as set forth above has low impurity content and can form a carbon film having even better electrical conductivity and strength. Moreover, the obtained dispersion liquid has even better fibrous carbon nanostructure dispersibility.

In the presently disclosed fibrous carbon nanostructure dispersion liquid, the fibrous carbon nanostructures preferably have a concentration per 1 L of the solvent of 1 mg/L or more. A dispersion liquid such as set forth above can form a carbon film having even better electrical conductivity and strength.

The presently disclosed fibrous carbon nanostructure dispersion liquid preferably does not substantially contain particles having a number-basis modal diameter of more than 500 nm. A dispersion liquid such as set forth above has low impurity content and can form a carbon film having even better electrical conductivity and strength. Moreover, this enables formation of a uniform carbon film and production of an electronic component having stable characteristics. In addition, the obtained dispersion liquid has even better fibrous carbon nanostructure dispersibility.

Moreover, the presently disclosed fibrous carbon nanostructure dispersion liquid preferably does not substantially contain particles having a number-basis modal diameter of more than 300 nm. A dispersion liquid such as set forth above has low impurity content and can form a carbon film having even better electrical conductivity and strength. Moreover, this enables formation of a uniform carbon film and production of an electronic component having stable characteristics. In addition, the obtained dispersion liquid has even better fibrous carbon nanostructure dispersibility.

In the presently disclosed fibrous carbon nanostructure dispersion liquid, metal impurities preferably have a concentration of less than $1 \times 10^{18}$ atoms/cm$^3$. A dispersion liquid such as set forth above has low impurity content and can form a carbon film having even better electrical conductivity and strength. Moreover, this enables production of an electronic component having stable characteristics and long service life. In addition, the obtained dispersion liquid has even better fibrous carbon nanostructure dispersibility.

Moreover, in the presently disclosed fibrous carbon nanostructure dispersion liquid, metal impurities preferably have a concentration of less than $15 \times 10^{10}$ atoms/cm$^3$. A dispersion liquid such as set forth above has low impurity content and can form a carbon film having even better electrical conductivity and strength. Moreover, this enables production of an electronic component having stable characteristics and long service life. In addition, the obtained dispersion liquid has even better fibrous carbon nanostructure dispersibility.

The presently disclosed fibrous carbon nanostructure dispersion liquid preferably does not substantially contain sediments and aggregates of the fibrous carbon nanostructures. A dispersion liquid such as set forth above has low impurity content and can form a carbon film having even better electrical conductivity and strength. Moreover, the obtained dispersion liquid has even better fibrous carbon nanostructure dispersibility.

The presently disclosed fibrous carbon nanostructure dispersion liquid is preferably used as a constituent material of a semiconductor device.

Advantageous Effect

According to this disclosure, it is possible to provide a fibrous carbon nanostructure dispersion liquid having excellent fibrous carbon nanostructure dispersibility.

BRIEF DESCRIPTION OF THE DRAWING

In the accompanying drawing,

FIG. 1 is a graph illustrating an example of a t-plot for a sample having pores at the surface thereof.

DETAILED DESCRIPTION

The following provides a detailed description of an embodiment of this disclosure.

(Fibrous Carbon Nanostructure Dispersion Liquid)

The presently disclosed fibrous carbon nanostructure dispersion liquid contains a solvent and one or more fibrous carbon nanostructures that exhibit a convex upward shape in a t-plot obtained from an adsorption isotherm.

In a case in which conventional carbon nanotubes are used, aggregates form after removal of metal impurities by acid treatment or the like and removal of particulate impurities by filtration or the like, leading to reduced light absorbance and poor dispersibility. However, as a consequence of fibrous carbon nanostructures that exhibit a convex upward shape in a t-plot obtained from an adsorption isotherm being used in the presently disclosed fibrous carbon nanostructure dispersion liquid, fibrous carbon nanostructure aggregation tends not to occur even after removal of metal impurities by acid treatment or the like and removal of particulate impurities by filtration or the like, and fibrous carbon nanostructure dispersibility is excellent.

<Fibrous Carbon Nanostructures>

The fibrous carbon nanostructures used to form a shaped product may be any fibrous carbon nanostructures that exhibit a convex upward shape in a t-plot obtained from an adsorption isotherm without any specific limitations, and examples thereof include carbon nanotubes and vapor-grown carbon fibers. One type of fibrous carbon nanostructure may be used individually, or two or more types of fibrous carbon nanostructures may be used together.

Of such examples, it is preferable to use fibrous carbon nanostructures including carbon nanotubes as the fibrous carbon nanostructures that exhibit a convex upward shape in a t-plot. When fibrous carbon nanostructures including carbon nanotubes are used, fibrous carbon nanostructure aggregation is further inhibited and a dispersion liquid having even better fibrous carbon nanostructure dispersibility can be obtained. Moreover, a dispersion liquid that can form a carbon film having even better electrical conductivity and strength is obtained.

The term "carbon film" as used in the present specification refers to a film composed by an assembly of fibrous carbon nanostructures such as carbon nanotubes.

The fibrous carbon nanostructures including carbon nanotubes may, without any specific limitations, be composed of only carbon nanotubes (CNTs) or be a mixture of CNTs and fibrous carbon nanostructures other than CNTs.

Note that it is more preferable that the fibrous carbon nanostructures including carbon nanotubes have not undergone CNT opening formation treatment and exhibit a convex upward shape in a t-plot.

In general, adsorption is a phenomenon in which gas molecules are taken onto a solid surface from the gas phase and is categorized as physical adsorption or chemical adsorption depending on the main cause of adsorption. The nitrogen gas adsorption method used for obtaining the t-plot utilizes physical adsorption. In general, when the adsorption temperature is kept constant, the number of nitrogen gas molecules that are adsorbed by a fibrous carbon nanostructure increases with increasing pressure. A plot of the relative pressure (ratio of pressure at adsorption equilibrium P and saturated vapor pressure P0) on a horizontal axis and the amount of adsorbed nitrogen gas on a vertical axis is referred to as an "isotherm". The isotherm is referred to as an "adsorption isotherm" in a situation in which the amount of adsorbed nitrogen gas is measured while increasing the pressure and is referred to as a "desorption isotherm" in a situation in which the amount of adsorbed nitrogen gas is measured while decreasing the pressure.

The t-plot is obtained from the adsorption isotherm measured by the nitrogen gas adsorption method by converting the relative pressure to an average thickness t (nm) of an adsorbed layer of nitrogen gas. Specifically, an average adsorbed nitrogen gas layer thickness t corresponding to a given relative pressure is determined from a known standard isotherm of average adsorbed nitrogen gas layer thickness t plotted against relative pressure P/P0 to perform this conversion and obtain a t-plot for the fibrous carbon nanostructure (t-plot method of de Boer et al.).

FIG. 1 illustrates a typical t-plot of a sample having pores at the surface thereof. In the case of a sample having pores at the surface thereof, growth of the adsorbed layer of nitrogen gas is categorized into the following processes (1) to (3). The gradient of the t-plot changes in accordance with processes (1) to (3) as illustrated in FIG. 1.

(1) A process in which a single molecular adsorption layer of nitrogen molecules is formed over the entire surface (2) A process in which a multi-molecular adsorption layer is formed and is accompanied by capillary condensation filling of pores (3) A process in which a multi-molecular adsorption layer is formed at a surface that appears to be non-porous due to the pores being filled by nitrogen In a t-plot of the fibrous carbon nanostructures used in this disclosure, the plot is on a straight line passing through the origin in a region in which the average adsorbed nitrogen gas layer thickness t is small, but, as t increases, the plot deviates downward from the straight line to form a convex upward shape as illustrated in FIG. 1. The shape of the t-plot described above indicates that the fibrous carbon nanostructures have a large ratio of internal specific surface area relative to total specific surface area and that there is a large number of openings in carbon nanostructures constituting the fibrous carbon nanostructures. As a result, the fibrous carbon nanostructures have a lower tendency to aggregate.

A bending point of the t-plot for the fibrous carbon nanostructures is preferably within a range of $0.2 \leq t$ (nm)$\leq 1.5$, more preferably within a range of $0.45 \leq t$ (nm)$\leq 1.5$, and even more preferably within a range of $0.55 \leq t$ (nm)$\leq 1.0$. When the position of the bending point of the t-plot is within any of the ranges set forth above, the fibrous carbon nanostructures have an even lower tendency to aggregate and a dispersion liquid having even better fibrous carbon nanostructure dispersibility is obtained.

The "position of the bending point" is defined as an intersection point of a linear approximation A for the above-described process (1) and a linear approximation B for the above-described process (3).

The fibrous carbon nanostructures preferably have a ratio (S2/S1) of internal specific surface area S2 relative to total specific surface area S1 obtained from the t-plot of at least 0.05 and not more than 0.30. When S2/S1 is at least 0.05 and not more than 0.30, the fibrous carbon nanostructures have an even lower tendency to aggregate and a dispersion liquid having even better fibrous carbon nanostructure dispersibility can be obtained.

Although no specific limitations are placed on the total specific surface area S1 and the internal specific surface area S2 of the fibrous carbon nanostructures, when considered individually, S1 is preferably at least 400 m$^2$/g and not more than 2,500 m$^2$/g, and more preferably at least 800 m$^2$/g and not more than 1,200 m$^2$/g, whereas S2 is preferably at least 30 m$^2$/g and not more than 540 m$^2$/g.

The total specific surface area S1 and the internal specific surface area S2 of the fibrous carbon nanostructures can be determined from the t-plot for the fibrous carbon nanostructures. Specifically, referring to the t-plot illustrated in FIG. 1 for the purpose of explanation, the total specific surface area S1 and external specific surface area S3 can first be determined from the gradient of the linear approximation of process (1) and the gradient of the linear approximation of process (3), respectively. The internal specific surface area S2 can then be calculated by subtracting the external specific surface area S3 from the total specific surface area S1.

Measurement of an adsorption isotherm of the fibrous carbon nanostructures, preparation of a t-plot, and calculation of total specific surface area S1 and internal specific surface area S2 based on analysis of the t-plot can be performed, for example, using a BELSORP®-mini (BELSORP is a registered trademark in Japan, other countries, or both), which is a commercially available measurement apparatus produced by Bel Japan Inc.

In a situation in which fibrous carbon nanostructures including CNTs are used, although no specific limitations are placed on the CNTs included among the fibrous carbon nanostructures and single-walled carbon nanotubes and/or multi-walled carbon nanotubes may be used, the CNTs are preferably carbon nanotubes having one to five walls, and are more preferably single-walled carbon nanotubes. A dispersion liquid having excellent fibrous carbon nanostructure dispersibility can be obtained when single-walled carbon nanotubes are used as compared to when multi-walled carbon nanotubes are used.

The fibrous carbon nanostructures are preferably fibrous carbon nanostructures for which a ratio (3σ/Av) of the diameter standard deviation (σ) multiplied by 3 (i.e., 3σ) relative to the average diameter (Av) is more than 0.20 and less than 0.60, more preferably fibrous carbon nanostructures for which 3σ/Av is more than 0.25, and even more preferably fibrous carbon nanostructures for which 3σ/Av is more than 0.40. A dispersion liquid having even better fibrous carbon nanostructure dispersibility can be obtained through use of fibrous carbon nanostructures for which 3σ/Av is more than 0.20 and less than 0.60.

The "average diameter (Av) of the fibrous carbon nanostructures" and the "diameter standard deviation (σ: sample standard deviation) of the fibrous carbon nanostructures" can each be determined by measuring the diameters (external diameters) of 100 randomly selected fibrous carbon nanostructures using a transmission electron microscope. The average diameter (Av) and the standard deviation (σ) of the fibrous carbon nanostructures may be adjusted by altering the production method or production conditions of the fibrous carbon nanostructures, or may be adjusted by combining a plurality of types of fibrous carbon nanostructures obtained by different production methods.

The fibrous carbon nanostructures that are used typically take a normal distribution when a plot is made of diameter measured as described above on a horizontal axis and probability density on a vertical axis, and a Gaussian approximation is made.

Moreover, it is preferable that the fibrous carbon nanostructures have a radial breathing mode (RBM) peak when evaluated by Raman spectroscopy. It should be noted that an RBM is not present in the Raman spectrum of fibrous carbon nanostructures composed only of multi-walled carbon nanotubes having three or more walls.

In a Raman spectrum of the fibrous carbon nanostructures, a ratio of G band peak intensity relative to D band peak intensity (G/D ratio) is preferably at least 1 and not more than 20. A dispersion liquid having even better fibrous carbon nanostructure dispersibility can be obtained when the G/D ratio is at least 1 and not more than 20.

The average diameter (Av) of the fibrous carbon nanostructures is preferably 0.5 nm or more, and more preferably 1 nm or more, and is preferably 15 nm or less, and more preferably 10 nm or less. A dispersion liquid having even better fibrous carbon nanostructure dispersibility can be obtained when the average diameter (Av) of the fibrous carbon nanostructures is at least 0.5 nm and not more than 15 nm.

The fibrous carbon nanostructures preferably have an average structure length at the time of synthesis of 100 μm or more. However, the average structure length at the time of synthesis is preferably 5,000 μm or less because fibrous carbon nanostructures that have a long structure length at the time of synthesis are more susceptible to damage by breaking, severing, or the like during dispersing.

The fibrous carbon nanostructures preferably have an aspect ratio (length/diameter) of more than 10. The aspect ratio of the fibrous carbon nanostructures can be determined by measuring the diameters and lengths of 100 randomly selected fibrous carbon nanostructures using a transmission electron microscope, and then calculating an average value of the ratio of diameter and length (length/diameter).

The BET specific surface area of the fibrous carbon nanostructures is preferably 400 m$^2$/g or more, and more preferably 800 m$^2$/g or more, and is preferably 2,500 m$^2$/g or less, and more preferably 1,200 m$^2$/g or less. The strength and free-standing ability of a carbon film formed using the obtained dispersion liquid can be further improved when the BET specific surface area of the fibrous carbon nanostructures is 400 m$^2$/g or more. Moreover, dispersibility of the fibrous carbon nanostructures in the obtained dispersion liquid can be further increased when the BET specific surface area of the fibrous carbon nanostructures is 2,500 m$^2$/g or less.

Herein, the term "BET specific surface area" refers to nitrogen adsorption specific surface area measured by the BET method.

The fibrous carbon nanostructures set forth above may be obtained by the subsequently described super growth method as an aggregate (aligned aggregate) that, on a substrate having a catalyst layer for carbon nanotube growth at the surface thereof, is aligned roughly perpendicularly to the substrate. In this situation, it is preferable that the mass density of the fibrous carbon nanostructures as the aggregate is at least 0.002 g/cm$^3$ and not more than 0.2 g/cm$^3$. The fibrous carbon nanostructures can be homogeneously dispersed in the fibrous carbon nanostructure dispersion liquid when the mass density is 0.2 g/cm$^3$ or less because binding between the fibrous carbon nanostructures in the liquid is weak. Moreover, a mass density of 0.002 g/cm$^3$ or more makes the fibrous carbon nanostructures easier to handle by improving the unity of the fibrous carbon nanostructures and preventing the fibrous carbon nanostructures from becoming unbound.

The fibrous carbon nanostructures preferably include pores. In particular, the fibrous carbon nanostructures preferably include micropores having a pore diameter of smaller than 2 nm, and the amount of these micropores in terms of micropore volume determined by the following method is preferably 0.40 mL/g or more, more preferably 0.43 mL/g or more, and even more preferably 0.45 mL/g or more, and normally has an upper limit of approximately 0.65 mL/g. When the fibrous carbon nanostructures include micropores as described above, the fibrous carbon nanostructures have an even lower tendency to aggregate. The micropore volume can be adjusted, for example, through appropriate alteration of the production method and production conditions of the fibrous carbon nanostructures.

Herein, "micropore volume (Vp)" can be calculated from equation (I)—$Vp=(V/22,414)\times(M/\rho)$—by measuring a nitrogen adsorption/desorption isotherm of the fibrous carbon nanostructures at liquid nitrogen temperature (77 K) and by setting an amount of adsorbed nitrogen at a relative pressure of P/P0=0.19 as V. It should be noted that P is measured pressure at adsorption equilibrium, P0 is saturated vapor pressure of liquid nitrogen at time of measurement, and, in equation (I), M is a molecular weight of 28.010 of the adsorbate (nitrogen), and $\rho$ is a density of 0.808 g/cm$^3$ of the adsorbate (nitrogen) at 77 K. The micropore volume can be measured, for example, using a BELSORP®-mini produced by Bel Japan Inc.

The fibrous carbon nanostructures set forth above can, for example, be efficiently produced by, in a method in which, during synthesis of CNTs through chemical vapor deposition (CVD) by supplying a feedstock compound and a carrier gas onto a substrate having a catalyst layer for carbon nanotube production at the surface thereof, a trace amount of an oxidizing agent (catalyst activating material) is provided in the system to dramatically improve the catalytic activity of the catalyst layer (super growth method; refer to WO 2006/011655 A1), forming the catalyst layer on the substrate surface by a wet process. Hereinafter, carbon nanotubes that are obtained by the super growth method are also referred to as "SGCNTs".

The fibrous carbon nanostructures produced by the super growth method may be composed of SGCNTs only, or may be composed of SGCNTs and non-cylindrical carbon nanostructures displaying electrical conductivity. Specifically, the fibrous carbon nanostructures may include single-walled or multi-walled flattened tube-shaped carbon nanostructures (hereinafter, also referred to as "graphene nanotapes (GNTs)") having a tape-shaped section at which inner walls are in proximity or adhered to each other along the entire length.

In the present specification, "having a tape-shaped section along the entire length" means "having a tape-shaped section continuously or non-continuously along 60% or more, preferably 80% or more, and even more preferably 100% of the longitudinal direction length (entire length)".

A GNT is presumed to be a material in which a tape-shaped section at which inner walls are in proximity or adhered to each other is formed along the entire length from the time of synthesis and in which a six-membered ring network of carbon is formed in a flattened tube shape. It is possible to confirm that a GNT has a flattened tube shape and that a tape-shaped section at which inner walls are in proximity or adhered to each other is present in the GNT by, for example, sealing the GNT in a quartz tube with fullerenes (C60), obtaining a fullerene-inserted GNT through heat treatment under reduced pressure (fullerene insertion treatment), and observing the fullerene-inserted GNT using a transmission electron microscope (TEM) to confirm that a section where fullerenes are not inserted (tape-shaped section) is present.

The shape of the GNT is preferably a shape having a tape-shaped section at a width direction central portion, more preferably a shape such that a cross-section perpendicular to an extension direction (axial line direction) of the GNT has a shape in which a maximum dimension in a direction perpendicular to a longitudinal direction of the cross-section is larger in proximity to both longitudinal direction ends of the cross-section than in proximity to a central portion in the longitudinal direction of the cross-section, and particularly preferably a dumbbell shape.

Herein, with regards to the cross-sectional shape of the GNT, "in proximity to a central portion in the longitudinal direction of the cross-section" refers to a region within 30% of the longitudinal direction width of the cross-section from a longitudinal central line in the cross-section (line that passes through the longitudinal direction center of the cross-section, perpendicularly to a longitudinal direction line), and "in proximity to longitudinal direction ends of the cross-section" refers to regions that are further outward in the longitudinal direction than "in proximity to a central portion in the longitudinal direction of the cross-section".

Note that fibrous carbon nanostructures including GNTs as non-cylindrical carbon nanostructures can be obtained by, in synthesis of CNTs by the super growth method using a substrate having a catalyst layer at the surface thereof, forming the substrate having the catalyst layer at the surface thereof (hereinafter, also referred to as a "catalyst substrate") by a specific method. Specifically, fibrous carbon nanostructures including GNTs can be obtained by applying an application liquid A containing an aluminum compound onto a substrate and drying the application liquid A that has been applied to form an aluminum thin film (catalyst supporting layer) on the substrate, subsequently applying an application liquid B containing an iron compound onto the aluminum thin film and drying the application liquid B that has been applied at a temperature of 50° C. or lower to form an iron thin film (catalyst layer) on the aluminum thin film, and then using the catalyst substrate obtained in this manner to synthesize CNTs by the super growth method.

The concentration of metal impurities contained in the fibrous carbon nanostructures is preferably less than 5,000 ppm, and more preferably less than 1,000 ppm from a viewpoint that this reduces impurities in the fibrous carbon nanostructure dispersion liquid and enables production of an electronic component having stable characteristics and long service life.

The concentration of metal impurities referred to in the present specification can be measured, for example, by a transmission electron microscope (TEM), a scanning electron microscope (SEM), energy dispersive X-ray analysis (EDAX), a vapor phase decomposition (VPD) device and ICP mass spectrometry (ICP/MS), or the like.

The metal impurities may be metal catalyst used in production of the fibrous carbon nanostructures or the like, and examples thereof include metal elements such as alkali metals, alkaline earth metals, various metal elements belonging to groups 3 to 13 and the lanthanides, Si, Sb, As, Pb, Sn, and Bi, and metal compounds containing these metal elements. More specific examples include metal elements such as Al, Sb, As, Ba, Be, Bi, B, Cd, Ca, Cr, Co, Cu, Ga, Ge, Fe, Pb, Li, Mg, Mn, Mo, Ni, K, Na, Sr, Sn, Ti, W, V, Zn, and Zr, and metal compounds containing these metal elements.

From a viewpoint of further improving fibrous carbon nanostructure dispersibility in the fibrous carbon nanostructure dispersion liquid and enabling formation of a uniform carbon film and production of an electronic component having stable characteristics, the fibrous carbon nanostructures preferably do not substantially contain particulate impurities having a particle diameter of more than 500 nm, more preferably do not substantially contain particulate impurities having a particle diameter of more than 300 nm, even more preferably do not substantially contain particulate impurities having a particle diameter of more than 100 nm, and particularly preferably do not substantially contain particulate impurities having a particle diameter of more than 45 nm.

The concentration of particulate impurities referred to in the present specification can be measured by applying the fibrous carbon nanostructure dispersion liquid onto a substrate and measuring the surface thereof using a Surfscan (product name) produced by KLA-Tencor Corporation or the like.

<Solvent>

Examples of the solvent include non-halogenated solvents and non-aqueous solvents. Specific examples of solvents that may be used include water; alcohols such as methanol, ethanol, n-propanol, isopropanol, n-butanol, isobutanol, t-butanol, pentanol, hexanol, heptanol, octanol, nonanol, decanol, amyl alcohol, methoxypropanol, propylene glycol, and ethylene glycol; ketones such as acetone, methyl ethyl ketone, and cyclohexanone; esters such as ethyl acetate, butyl acetate, ethyl lactate, esters of α-hydroxycarboxylic acids, and benzyl benzoate; ethers such as diethyl ether, dioxane, tetrahydrofuran, and monomethyl ethers; amide-based polar organic solvents such as N,N-dimethylformamide and N-methylpyrrolidone; aromatic hydrocarbons such as toluene, xylene, chlorobenzene, ortho-dichlorobenzene, and para-dichlorobenzene; salicylaldehyde, dimethyl sulfoxide, 4-methyl-2-petanone, N-methylpyrrolidone, γ-butyrolactone, and tetramethylammonium hydroxide. Of these solvents, water, ethyl lactate, isopropanol, and methyl ethyl ketone are preferable from a viewpoint of having particularly good dispersibility. One of these solvents may be used individually, or two or more of these solvents may be used as a mixture.

In terms of the fibrous carbon nanostructure concentration in the fibrous carbon nanostructure dispersion liquid of the present embodiment, it is preferable that 1 mg or more of the fibrous carbon nanostructures are contained per 1 L of the solvent, and more preferable that 100 mg or more of the fibrous carbon nanostructures are contained per 1 L of the solvent. Moreover, it is preferable that 10,000 mg or less of the fibrous carbon nanostructures are contained per 1 L of the solvent. The inclusion of 1 mg or more of the fibrous carbon nanostructures relative to the solvent enables formation of a carbon film having excellent electrical conductivity and strength. Moreover, the inclusion of 10,000 mg or less of the fibrous carbon nanostructures inhibits aggregation of the fibrous carbon nanostructures and enables a dispersion liquid having even better fibrous carbon nanostructure dispersibility to be obtained.

The fibrous carbon nanostructure concentration in the fibrous carbon nanostructure dispersion liquid of the present embodiment is preferably 0.005 mass % or more, and more preferably 0.01 mass % or more, and is preferably 5 mass % or less, and more preferably 0.5 mass % or less. A fibrous carbon nanostructure concentration of 0.005 mass % or more enables formation of a carbon film having excellent electrical conductivity and strength. Moreover, a fibrous carbon nanostructure concentration of 5 mass % or less inhibits aggregation of the fibrous carbon nanostructures and enables a dispersion liquid having even better fibrous carbon nanostructure dispersibility to be obtained.

It is preferable that the fibrous carbon nanostructure dispersion liquid of the present embodiment does not substantially contain a dispersant from a viewpoint that a carbon film having even better electrical conductivity and strength can be formed and a dispersion liquid having even better fibrous carbon nanostructure dispersibility is obtained. The phrase "does not substantially contain" as used in the present specification means not actively included other than as a result of unavoidable inclusion. Specifically, the content in the fibrous carbon nanostructure dispersion liquid is preferably less than 0.05 mass %, more preferably less than 0.01 mass %, and even more preferably less than 0.001 mass %.

Examples of dispersants include surfactants, synthetic polymers, and natural polymers.

Examples of surfactants include sodium dodecylsulfonate, sodium deoxycholate, sodium cholate, and sodium dodecylbenzenesulfonate.

Examples of synthetic polymers include polyether diols, polyester diols, polycarbonate diols, polyvinyl alcohol, partially saponified polyvinyl alcohol, acetoacetyl group-modified polyvinyl alcohol, acetal group-modified polyvinyl alcohol, butyral group-modified polyvinyl alcohol, silanol group-modified polyvinyl alcohol, ethylene-vinyl alcohol copolymers, ethylene-vinyl alcohol-vinyl acetate copolymer resins, dimethylaminoethyl acrylate, dimethylaminoethyl methacrylate, acrylic resins, epoxy resins, modified epoxy resins, phenoxy resins, modified phenoxy resins, phenoxy ether resins, phenoxy ester resins, fluororesins, melamine resins, alkyd resins, phenolic resins, polyacrylamide, polyacrylic acid, polystyrene sulfonic acid, polyethylene glycol, and polyvinyl pyrrolidone.

Examples of natural polymers include polysaccharides such as starch, pullulan, dextran, dextrin, guar gum, xanthan gum, amylose, amylopectin, alginic acid, gum Arabic, carrageenan, chondroitin sulfate, hyaluronic acid, curdlan, chitin, chitosan, cellulose, and salts and derivatives thereof.

It is preferable that the fibrous carbon nanostructure dispersion liquid of the present embodiment does not substantially contain particles having a number-basis modal diameter of more than 500 nm from a viewpoint that fibrous carbon nanostructure dispersibility is further improved, a uniform carbon film can be formed, and an electronic component having stable characteristics can be produced. In particular, it is preferable that the fibrous carbon nanostructure dispersion liquid does not substantially contain particles having a number-basis modal diameter of more than 300 nm.

The number-basis modal diameter referred to in the present specification can be determined by the following method.

The particle diameters of fibrous carbon nanostructures contained in a fibrous carbon nanostructure dispersion liquid are measured using a laser diffraction/scattering particle diameter distribution analyzer (for example, model "LA-960" produced by Horiba, Ltd.). A particle diameter distribution curve with particle diameter on the horizontal axis and number of fibrous carbon nanostructures on the vertical axis is obtained, and the particle diameter at a maximum value on this curve is determined as the number-basis modal diameter of the fibrous carbon nanostructures.

The modal diameter of the fibrous carbon nanostructures contained in the fibrous carbon nanostructure dispersion liquid can be freely altered by adjusting the production conditions of the fibrous carbon nanostructures or the fibrous carbon nanostructure dispersion liquid.

The concentration of metal impurities in the fibrous carbon nanostructure dispersion liquid of the present embodiment is preferably less than $1\times10^{18}$ atoms/cm$^3$, and more preferably less than $15\times10^{10}$ atoms/cm$^3$ from a viewpoint that impurities in the fibrous carbon nanostructure dispersion liquid are reduced and an electronic component having stable characteristics and long service life can be produced.

The concentration of heavy metal impurities in the fibrous carbon nanostructure dispersion liquid of the present embodiment is preferably less than $1\times10^{18}$ atoms/cm$^3$, and more preferably less than $1\times10^{11}$ atoms/cm$^3$ from a viewpoint that impurities in the fibrous carbon nanostructure dispersion liquid are reduced and an electronic component having stable characteristics and long service life can be produced.

In the present specification, the term "heavy metal" refers to a metal having a specific gravity of 5 g/mL or more.

The concentration of group 1 element and group 2 element impurities in the fibrous carbon nanostructure dispersion liquid of the present embodiment is preferably less than $1\times10^{18}$ atoms/cm$^3$, and more preferably less than $1\times10^{11}$ atoms/cm$^3$ from a viewpoint that impurities in the fibrous carbon nanostructure dispersion liquid are reduced and an electronic component having stable characteristics and long service life can be produced.

The concentration of transition metal element impurities in the fibrous carbon nanostructure dispersion liquid of the present embodiment is preferably less than $1\times10^{18}$ atoms/cm$^3$, and more preferably less than $1\times10^{11}$ atoms/cm$^3$ from a viewpoint that impurities in the fibrous carbon nanostructure dispersion liquid are reduced and an electronic component having stable characteristics and long service life can be produced.

It is preferable that the fibrous carbon nanostructure dispersion liquid of the present embodiment does not substantially contain sediments and aggregates of the fibrous carbon nanostructures from a viewpoint that fibrous carbon nanostructure dispersibility is further improved and a uniform carbon film can be formed.

In the present specification, the terms "sediments" and "aggregates" refer to fibrous nanostructures that sediment upon 20 minutes of centrifugation at 10,000 G.

The fibrous carbon nanostructure dispersion liquid of the present embodiment preferably does not substantially contain particulate impurities having a particle diameter of more than 300 nm, more preferably does not substantially contain particulate impurities having a particle diameter of more than 100 nm, and even more preferably does not substantially contain particulate impurities having a particle diameter of more than 45 nm from a viewpoint that fibrous carbon nanostructure dispersibility is further improved, a uniform carbon film can be formed, and an electronic component having stable characteristics can be produced.

The particle diameter and concentration of particulate impurities referred to in the present specification can be measured by applying the fibrous carbon nanostructure dispersion liquid onto a substrate and measuring the surface thereof using a Surfscan (product name) produced by KLA-Tencor Corporation or the like.

<Physical Properties>

The viscosity of the fibrous carbon nanostructure dispersion liquid of the present embodiment is preferably 0.5 mPa·s or more, and more preferably 1 mPa·s or more, and is preferably 1,000 mPa·s or less, and more preferably 100 mPa·s or less. The fibrous carbon nanostructure dispersion liquid has excellent fibrous carbon nanostructure dispersibility when the viscosity thereof is at least 0.5 mPa·s and not more than 1,000 mPa·s.

Herein, the "viscosity of the fibrous carbon nanostructure dispersion liquid" can be measured in accordance with JIS Z8803 at a temperature of 25° C.

The light absorbance of the fibrous carbon nanostructure dispersion liquid of the present embodiment at an optical path length of 1 mm and a wavelength of 1,000 nm as measured using a spectrophotometer is preferably 0.1 or more, and more preferably 0.2 or more, and is preferably 5.0 or less, and more preferably 3.0 or less from a viewpoint of dispersibility. It is possible to ensure that a sufficient amount of fibrous carbon nanostructures is contained in the fibrous carbon nanostructure dispersion liquid when the light absorbance of the fibrous carbon nanostructure dispersion liquid is 0.1 or more. Moreover, the proportion of fibrous carbon nanostructures having high dispersibility in the fibrous carbon nanostructure dispersion liquid can be increased and a carbon film having excellent electrical conductivity and strength can be formed when the light absorbance of the fibrous carbon nanostructure dispersion liquid is 5.0 or less.

A light absorbance ratio of the fibrous carbon nanostructure dispersion liquid of the present embodiment is preferably 0.5 or more, and more preferably 0.7 to 1.0 from a viewpoint that the amount of aggregates is small, purity is high, and fibrous carbon nanostructure dispersibility is excellent.

Herein, the "light absorbance ratio" can be measured by a method described in evaluation of "(2) Light absorbance ratio" described further below.

<Applications>

The fibrous carbon nanostructure dispersion liquid of the present embodiment can be used in production of electronic products, examples of which include electronic components such as electronic circuits (for example, logic circuits), memory (for example, DRAM, SRAM, and NRAM), semiconductor devices, interconnects, complementary MOS, and bipolar transistors; chemical sensors such as detectors for trace gases and the like; biosensors such as measuring instruments for DNA, proteins, and the like; and conductive films for solar cells, touch panels, and the like. For example, the fibrous carbon nanostructure dispersion liquid of the present embodiment may be used as an application liquid or a constituent material in production of an electronic product. Of such applications, use as a constituent material of a semiconductor device is suitable from a viewpoint that a product having excellent electrical conductivity and strength is obtained.

(Production Method of Fibrous Carbon Nanostructure Dispersion Liquid)

The method by which the fibrous carbon nanostructure dispersion liquid of the present embodiment is produced may, for example, be a method including a step of performing centrifugal separation of a dispersed mixture containing a plurality of fibrous carbon nanostructures and a solvent to cause sedimentation of a portion of the plurality of fibrous carbon nanostructures (centrifugal separation step) and a step of fractionating a supernatant from the dispersed mixture that has undergone centrifugal separation in the centrifugal separation step (fractionation step). Moreover, a step in which a coarse dispersion liquid obtained by adding a plurality of fibrous carbon nanostructures into a solvent is subjected to dispersion treatment to obtain a dispersed mixture (dispersed mixture preparation step) may be included prior to the centrifugal separation step.

The method by which the fibrous carbon nanostructure dispersion liquid of the present embodiment is produced may, for example, be a method in which a large amount of fibrous carbon nanostructures is added into a solvent to form a coarse dispersion liquid, and then agitation of the coarse dispersion liquid is performed by ultrasonication or the like to disperse the fibrous carbon nanostructures and obtain a dispersed mixture. Moreover, the dispersed mixture obtained after agitation by ultrasonication may be subjected to centrifugal separation, and a supernatant containing fibrous carbon nanostructures may be collected. Moreover, solvent may be added to and mixed with the centrifugally separated sediment, the resultant mixture may be ultrasonicated to cause dispersion and subsequently subjected to centrifugal separation, and a supernatant containing fibrous carbon nanostructures may be collected. Furthermore, treatment of adding and mixing solvent with the centrifugally separated sediment, performing ultrasonication to cause dispersion, and subsequently performing centrifugal separation and supernatant collection may be performed repeatedly.

Through the production method of the fibrous carbon nanostructure dispersion liquid set forth above, a dispersion liquid having low aggregated fibrous carbon nanostructure content, low impurity content, and excellent fibrous carbon nanostructure dispersibility is obtained.

<Dispersed Mixture Preparation Step>

In the dispersed mixture preparation step, a dispersed mixture containing a plurality of fibrous carbon nanostructures and a solvent can be obtained through dispersion treatment of a coarse dispersion liquid obtained by adding a plurality of fibrous carbon nanostructures into a solvent.

Note that the dispersed mixture preparation step may be omitted and the subsequently described centrifugal separation step may be performed by using, as the dispersed mixture, a commercially available dispersed mixture of fibrous carbon nanostructures obtained by dispersing a plurality of fibrous carbon nanostructures in a solvent. However, it is preferable to use a dispersed mixture prepared by implementing the dispersed mixture preparation step from a viewpoint that a fibrous carbon nanostructure dispersion liquid having the desired dispersibility can easily be obtained.

The fibrous carbon nanostructures that are added to the solvent may be subjected to pretreatment prior to addition in order to separate metal and particulate impurities such as amorphous carbon, and reduce alkali metal ions, halogen ions, oligomers, and polymers.

Purification treatment for separation of metal may, for example, be purification treatment in which fibrous carbon nanostructures are dispersed in an acid solution of nitric acid, hydrochloric acid, or the like to dissolve metal impurities or magnetic purification treatment. Of these examples, purification treatment in which the fibrous carbon nanostructures are dispersed in an acid solution to dissolve metal impurities is preferable.

Pretreatment for separating particulate impurities may, for example, be purification treatment such as high-speed centrifugation using an ultracentrifuge or the like; filter filtration by gravity filtration, cross flow filtration, vacuum filtration, or the like; selective oxidation of non-fullerene carbon material; or a combination thereof.

[Coarse Dispersion Liquid]

The coarse dispersion liquid can be obtained by mixing the above-described fibrous carbon nanostructures and the above-described solvent by a known method without any specific limitations. Note that the fibrous carbon nanostructures and the solvent may be mixed in any order. Besides the components described above, additives that are typically used in production of fibrous carbon nanostructure dispersion liquids may be further added to the coarse dispersion liquid.

However, it is preferable that surfactants and polymers such as resins are not added to the dispersed mixture.

[Dispersion Treatment]

The method of dispersion treatment in preparation of the dispersed mixture through dispersion treatment of the coarse dispersion liquid may be a known method of dispersion treatment that is used for dispersion of fibrous carbon nanostructure-containing liquids without any specific limitations. Of such methods, the dispersion treatment to which the coarse dispersion liquid is subjected is preferably dispersion treatment that brings about a cavitation effect or a crushing effect. Through dispersion treatment that brings about a cavitation effect or a crushing effect, the fibrous carbon nanostructures can be favorably dispersed so as to obtain a fibrous carbon nanostructure dispersion liquid having even better dispersibility.

[[Dispersion Treatment that Brings about Cavitation Effect]]

The dispersion treatment that brings about a cavitation effect is a dispersion method that utilizes shock waves caused by the rupture of vacuum bubbles formed in water when high energy is applied to the liquid. This dispersion method enables favorable dispersion of the fibrous carbon nanostructures.

Specific examples of dispersion treatments that bring about a cavitation effect include dispersion treatment using ultrasound, dispersion treatment using a jet mill, and dispersion treatment using high-shear stirring. One of these dispersion treatments may be carried out or a plurality of these dispersion treatments may be carried out in combination. More specifically, an ultrasonic homogenizer, a jet mill, or a high-shear stirring device may, for example, suitably be used. Conventional commonly known devices may be used as the aforementioned devices.

In a situation in which the fibrous carbon nanostructures are dispersed using an ultrasonic homogenizer, the coarse dispersion liquid is irradiated with ultrasound by the ultrasonic homogenizer. The irradiation time may be set as appropriate depending on the amount of fibrous carbon nanostructures and so forth. For example, the irradiation time is preferably 3 minutes or more, and more preferably 30 minutes or more, and is preferably 5 hours or less, and more preferably 2 hours or less. Moreover, the power is, for example, preferably at least 20 W and not more than 500 W, and more preferably at least 100 W and not more than 500 W. Furthermore, the temperature is, for example, preferably at least 15° C. and not higher than 50° C.

In a situation in which a jet mill is used, the number of treatment cycles carried out may be set as appropriate depending on the amount of fibrous carbon nanostructures and so forth. For example, the number of treatment cycles is preferably 2 or more, and is preferably 100 or fewer, and more preferably 50 or fewer. Moreover, the pressure is, for example, preferably at least 20 MPa and not more than 250 MPa. Furthermore, the temperature is, for example, preferably at least 15° C. and not higher than 50° C.

In a situation in which a high-shear stirring device is used, the coarse dispersion liquid is subjected to stirring and shearing using the high-shear stirring device. The rotational speed is preferably as fast as possible. The operating time (i.e., the time that the device is rotating) is, for example, preferably at least 3 minutes and not more than 4 hours. Moreover, the circumferential speed is, for example, preferably at least 5 m/s and not more than 50 m/s. Furthermore, the temperature is, for example, preferably at least 15° C. and not higher than 50° C.

It should be noted that the dispersion treatment that brings about a cavitation effect set forth above is more preferably performed at a temperature of 50° C. or lower. The reason for this is in order to suppress change in concentration that occurs due to volatilization of the solvent.

[[Dispersion Treatment that Brings about Crushing Effect]]

Dispersion treatment that brings about a crushing effect is even more beneficial because in addition to of course enabling uniform dispersion of the fibrous carbon nanostructures in the solvent, dispersion treatment that brings about a crushing effect can also suppress damage to the fibrous carbon nanostructures due to shock waves when bubbles burst compared to dispersion treatment that brings about a cavitation effect set forth above.

The dispersion treatment that brings about a crushing effect can uniformly disperse the fibrous carbon nanostructures in the solvent by causing crushing and dispersion of fibrous carbon nanostructure aggregates by imparting shear force on the coarse dispersion liquid and by further applying back pressure to the coarse dispersion liquid, while cooling the coarse dispersion liquid as necessary in order to suppress bubble formation.

When applying back pressure to the coarse dispersion liquid, although the back pressure applied to the coarse dispersion liquid may be lowered at once to atmospheric pressure, the pressure is preferably lowered over multiple steps.

Herein, in order to impart shear force on the coarse dispersion liquid and achieve further dispersion of the fibrous carbon nanostructures, a dispersing system may for example be used that includes a disperser having a structure such as described below.

Specifically, the disperser includes, in order toward an outflow-side from an inflow-side for the coarse dispersion liquid, a disperser orifice having an inner diameter d1, a dispersion space having an inner diameter d2, and a terminal section having an inner diameter d3 (where d2>d3>d1).

In this disperser, when the in-flowing coarse dispersion liquid passes through the disperser orifice at high pressure (for example, 10 MPa to 400 MPa, and preferably 50 MPa to 250 MPa), the coarse dispersion liquid is reduced in pressure while becoming a high-flow rate fluid that flows into the dispersion space. Thereafter, the high-flow rate coarse dispersion liquid that has flowed into the dispersion space flows at high speed inside the dispersion space while receiving shear force. As a result, the flow rate of the coarse dispersion liquid decreases and the fibrous carbon nanostructures are favorably dispersed. A fluid at a lower pressure (back pressure) than the pressure of the in-flowing coarse dispersion liquid then flows out from the terminal section as a liquid in which the fibrous carbon nanostructures are dispersed.

Note that the back pressure can be applied on the coarse dispersion liquid by applying a load to flow of the coarse dispersion liquid. For example, a desired back pressure can be applied on the coarse dispersion liquid by providing a multi-step pressure reducer downstream of the disperser.

As a result of the back pressure of the coarse dispersion liquid being reduced over multiple steps by the multi-step pressure reducer, bubble formation in the dispersed mixture can be suppressed when the dispersed mixture is finally exposed to atmospheric pressure.

The disperser may include a heat exchanger or a cooling liquid supply mechanism for cooling the coarse dispersion liquid. The reason for this is that by cooling the coarse dispersion liquid that is at a high temperature due to the application of shear force in the disperser, bubble formation in the coarse dispersion liquid can be further suppressed.

As an alternative to inclusion of a heat exchanger or the like, bubble formation in the fibrous carbon nanostructure-containing liquid can also be suppressed by cooling the coarse dispersion liquid in advance.

As explained above, the dispersion treatment that brings about a crushing effect can suppress cavitation and can therefore restrict damage to the fibrous carbon nanostructures caused by cavitation, and in particular damage to the fibrous carbon nanostructures caused by shock waves when bubbles burst, which may be a concern in some cases. Additionally, adhesion of bubbles to the fibrous carbon nanostructures and energy loss due to bubble formation can be suppressed, and the fibrous carbon nanostructures can be uniformly and efficiently dispersed.

One example of a dispersing system having a configuration such as described above is a BERYU SYSTEM PRO (product name) produced by Beryu Corp. The dispersion treatment that brings about a crushing effect can be implemented using a dispersing system such as described above under dispersing conditions that are controlled as appropriate.

<Centrifugal Separation Step>

In the centrifugal separation step, a portion of the plurality of fibrous carbon nanostructures can be caused to sediment through centrifugal separation of the dispersed mixture containing the plurality of fibrous carbon nanostructures and the solvent. Fibrous carbon nanostructures having high aggregating tendency sediment and fibrous carbon nanostructures having excellent dispersibility remain in the supernatant in the centrifugal separation step.

The centrifugal separation of the dispersed mixture can be performed using a known centrifugal separator without any specific limitations.

In particular, the centrifugal acceleration in centrifugal separation of the dispersed mixture is preferably 2,000 G or more, and more preferably 5,000 G or more, and is preferably 20,000 G or less, and more preferably 15,000 G or less from a viewpoint of causing fibrous carbon nanostructures having excellent dispersibility to remain in the resultant supernatant to an appropriate degree and obtaining a fibrous carbon nanostructure dispersion liquid having excellent dispersibility.

Moreover, the centrifugal separation time in centrifugal separation of the dispersed mixture is preferably 20 minutes or more, and more preferably 30 minutes or more, and is preferably 120 minutes or less, and more preferably 90 minutes or less from a viewpoint of causing fibrous carbon nanostructures having excellent dispersibility to remain in the resultant supernatant to an appropriate degree and obtaining a fibrous carbon nanostructure dispersion liquid having excellent dispersibility.

<Fractionation Step>

In the fractionation step, the supernatant can be fractionated from the dispersed mixture that has undergone centrifugal separation in the centrifugal separation step. Fractionation of the supernatant can be performed, for example, by decantation, pipetting, or the like that leaves a sediment layer and collects the supernatant. Specifically, a supernatant that, for example, is present in a section from the liquid surface of the centrifugally separated dispersed mixture to 5/6 of the depth of the dispersed mixture may be collected.

[Supernatant]

The supernatant that is fractionated from the centrifugally separated dispersed mixture contains fibrous carbon nanostructures that did not sediment in the centrifugal separation. This supernatant may be used as the fibrous carbon nanostructure dispersion liquid of the present embodiment.

EXAMPLES

The following provides a more specific description of this disclosure based on examples. However, this disclosure is not limited to these examples. In the following description, "%" used to express quantities is by mass, unless otherwise specified.

Example 1

<Production of Fibrous Carbon Nanostructures>

SGCNTs were synthesized as fibrous carbon nanostructures in accordance with the super growth method described in JP 4621896 B under the following conditions.

Feedstock carbon compound: Ethylene; feed rate 50 sccm
Atmosphere: Helium/hydrogen mixed gas; feed rate 1,000 sccm
Pressure: 1 atm
Water vapor additive amount: 300 ppm
Reaction temperature: 750° C.
Reaction time: 10 minutes
Metal catalyst: Iron thin film (thickness 1 nm)
Substrate: Silicon wafer Purification was performed by stirring 1 g of the obtained SGCNTs in 250 mL of 7.7 M $HNO_3$ for 8 hours and refluxing at 125° C. for 12 hours. Thereafter, 1,800 mL of deionized water was added and ultrasonication was performed for 60 minutes at 40 kHz using an ultrasonic irradiation machine (produced by Honda Electronics Co., Ltd.; product name: WTC-1200-40). Cross flow filtration was then performed using a 0.02 μm ceramic membrane. Passing through the ceramic membrane was performed until a pH of 4.0 was reached. Liquid that passed through the ceramic membrane was disposed of as a permeate and liquid that did not pass through pores in the filter was collected as a retentate. Next, 0.1% ammonia water was added to the retentate to further adjust the pH of the retentate to 7.1, and ultrasonication of the retentate was performed for 2 hours using the ultrasonic irradiation machine. Thereafter, four cycles of 20 minutes of centrifugation at 10,000 G using an ultracentrifuge (produced by Hitachi Koki Co., Ltd.; product name: CP-80NX) and supernatant collection were performed to obtain a fibrous carbon nanostructure dispersion liquid. The volume of the obtained fibrous carbon nanostructure dispersion liquid was 100 mL.

Example 2

A fibrous carbon nanostructure dispersion liquid was obtained in the same way as in Example 1 with the exception that the reaction time in synthesis of SGCNTs as fibrous carbon nanostructures was set as 15 minutes. The volume of the obtained fibrous carbon nanostructure dispersion liquid was 90 mL.

Example 3

A fibrous carbon nanostructure dispersion liquid was obtained in the same way as in Example 1 with the exception that the feedstock carbon compound in synthesis of SGCNTs as fibrous carbon nanostructures was set as ethylene with a feed rate of 100 sccm. The volume of the obtained fibrous carbon nanostructure dispersion liquid was 100 mL.

Comparative Example 1

A fibrous carbon nanostructure dispersion liquid was obtained in the same way as in Example 1 with the exception that SWCNTs (HiPco Super Purified) produced by NanoIntegris were used as fibrous carbon nanostructures.

[Evaluation]

(1) t-Plot Shape, Total Specific Surface Area, and Internal Specific Surface Area A cell designated for use in a fully automatic specific surface area measurement device (produced by Mountech Co., Ltd.; product name: Macsorb® HM model-1210 (Macsorb is a registered trademark in Japan, other countries, or both)) was sufficiently dried through at least 5 hours of heat treatment at 110° C., and 20 mg of fibrous carbon nanostructures obtained in each example or comparative example was loaded into the cell. The cell was then set at a specific position in the measurement device and the BET specific surface area was measured by an automatic operation. The principle of measurement of this device was in accordance with a method in which an adsorption isotherm of liquid nitrogen at 77 K is measured and then the specific surface area is measured from the adsorption isotherm by the BET (Brunauer-Emmett-Teller) method.

A t-plot was prepared through conversion of relative pressure to average nitrogen gas adsorption layer thickness t (nm) in the adsorption isotherm obtained in measurement of the BET specific surface area described above. The shape of the prepared t-plot was inspected, and the t-plot bending point, total specific surface area ($m^2/g$), and internal specific surface area ($m^2/g$) were calculated from the t-plot. Note that the value of the t-plot bending point was unclear in Comparative Example 1.

The principle of measurement of the t-plot was in accordance with the t-plot method of de Boer et al.

(2) Light Absorbance Ratio

A fibrous carbon nanostructure dispersion liquid was produced in the same way as in Example 1 by adding 21 mg of the fibrous carbon nanostructures used in each example or comparative example into 10 mL of ethyl lactate prior to purification pretreatment of the fibrous carbon nanostructures. The fibrous carbon nanostructure dispersion liquid for which purification pretreatment had not been performed (unpurified dispersion liquid) and the fibrous carbon nanostructure dispersion liquid obtained in each example or comparative example for which purification pretreatment had been performed (purified dispersion liquid) were used in light absorbance measurement at a wavelength of 550 nm and an optical path length of 10 mm by a spectrophotometer (produced by JASCO Corporation; product name: V670).

A light absorbance ratio was determined by the following equation.

Light absorbance ratio=(Light absorbance of purified dispersion liquid)/(Light absorbance of unpurified dispersion liquid)

Note that the amount of metal impurities in each fibrous carbon nanostructure dispersion liquid was measured by ICP mass spectrometry. Moreover, each fibrous carbon nanostructure dispersion liquid was centrifuged at 10,000 G for 20 minutes and the presence or absence of sedimented aggregates was inspected.

TABLE 1

|  |  | Example 1 | Example 2 | Example 3 | Comparative Example 1 |
|---|---|---|---|---|---|
| t-Plot | Shape | Convex upward | Convex upward | Convex upward | Straight line |
|  | Bending point (nm) | 0.6 | 0.6 | 0.7 | — |
|  | Total specific surface area S1 (m$^2$/g) | 1050 | 1230 | 650 | 600 |
|  | Internal specific surface area S2 (m$^2$/g) | 250 | 110 | 190 | 600 |
|  | S2/S1 | 0.24 | 0.09 | 0.29 | 1.00 |
| Light absorbance ratio |  | 0.75 | 0.60 | 0.65 | 0.40 |
| Amount of metal impurities (atoms/cm$^3$) |  | $10^7$ | $10^{16}$ | $10^{11}$ | $10^{25}$ |
| Aggregates |  | Not substantially observed | Not substantially observed | Not substantially observed | Observed |

As shown in Table 1, fibrous carbon nanostructure dispersion liquids in Examples 1 to 3, which each contained fibrous carbon nanostructures exhibiting a convex upward shape in a t-plot, were not susceptible to aggregation due to purification pretreatment and had a light absorbance ratio of at least 0.5. Moreover, these fibrous carbon nanostructure dispersion liquids had high purity and excellent fibrous carbon nanostructure dispersibility.

INDUSTRIAL APPLICABILITY

According to this disclosure, it is possible to provide a fibrous carbon nanostructure dispersion liquid having excellent fibrous carbon nanostructure dispersibility.

The invention claimed is:

1. A fibrous carbon nanostructure dispersion liquid comprising:
    one or more fibrous carbon nanostructures that exhibit a convex upward shape in a t-plot obtained from an adsorption isotherm; and
    a solvent,
    wherein the fibrous carbon nanostructures include graphene nanotapes having a tape-shaped section at which inner walls are in proximity or adhered to each other along its entire length, and
    wherein metal impurities have a concentration of less than 15×10$^{10}$ atoms/cm$^3$.

2. The fibrous carbon nanostructure dispersion liquid according to claim 1, wherein
    the t-plot has a bending point within a range of 0.2≤t (nm)≤1.5.

3. The fibrous carbon nanostructure dispersion liquid according to claim 1, wherein
    total specific surface area S1 and internal specific surface area S2 obtained from the t-plot satisfy 0.05≤S2/S1≤0.30.

4. The fibrous carbon nanostructure dispersion liquid according to claim 1, wherein
    a content of a dispersant in the fibrous carbon nanostructure dispersion liquid is less than 0.05 mass %.

5. The fibrous carbon nanostructure dispersion liquid according to claim 1, wherein
    the fibrous carbon nanostructures have a concentration per 1 of the solvent of 1 mg/L or more.

6. The fibrous carbon nanostructure dispersion liquid according to claim 1, wherein
    a content of particles having a number-basis modal diameter of more than 500 nm in the fibrous carbon nanostructure dispersion liquid is less than 0.05 mass %.

7. The fibrous carbon nanostructure dispersion liquid according to claim 6, wherein
    a content of particles having a number-basis modal diameter of more than 300 nm in the fibrous carbon nanostructure dispersion liquid is less than 0.05 mass %.

8. The fibrous carbon nanostructure dispersion liquid according to claim 1, wherein
    a content of sediments and aggregates of the fibrous carbon nanostructures in the fibrous carbon nanostructure dispersion liquid is less than 0.05 mass %.

9. The fibrous carbon nanostructure dispersion liquid according to claim 1 used as a constituent material of a semiconductor device.

* * * * *